(12) United States Patent
Morita et al.

(10) Patent No.: US 10,824,039 B2
(45) Date of Patent: Nov. 3, 2020

(54) LIGHT CONTROL DRIVING DEVICE, IMAGING APPARATUS, AND LIGHT CONTROL DRIVING METHOD

(71) Applicant: Sony Corporation, Tokyo (JP)

(72) Inventors: Shintarou Morita, Kanagawa (JP); Yasuhiro Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 19 days.

(21) Appl. No.: 15/762,674

(22) PCT Filed: Aug. 5, 2016

(86) PCT No.: PCT/JP2016/073181
§ 371 (c)(1),
(2) Date: Mar. 23, 2018

(87) PCT Pub. No.: WO2017/061169
PCT Pub. Date: Apr. 13, 2017

(65) Prior Publication Data
US 2018/0267342 A1 Sep. 20, 2018

(30) Foreign Application Priority Data
Oct. 7, 2015 (JP) ................................ 2015-199576

(51) Int. Cl.
*G02F 1/137* (2006.01)
*H04N 5/238* (2006.01)
(Continued)

(52) U.S. Cl.
CPC ............ *G02F 1/137* (2013.01); *G02F 1/1347* (2013.01); *G02F 1/13306* (2013.01);
(Continued)

(58) Field of Classification Search
None
See application file for complete search history.

(56) References Cited

U.S. PATENT DOCUMENTS

| 2002/0067322 | A1  | 6/2002 | Yanagawa et al. |
| 2012/0019761 | A1* | 1/2012 | Nystrom ............. G02F 1/13439 349/139 |
| 2014/0028924 | A1* | 1/2014 | Yamaguchi ............... G02F 1/29 349/1 |

FOREIGN PATENT DOCUMENTS

| CN | 101008756 A | 8/2007 |
| CN | 102163409 A | 8/2011 |

(Continued)

OTHER PUBLICATIONS

Chinese Office Action dated Mar. 3, 2020 for corresponding Chinese Application No. 201680057252.5.

*Primary Examiner* — James A Dudek
(74) *Attorney, Agent, or Firm* — Michael Best & Friedrich LLP

(57) ABSTRACT

[Object] Reduction of the influence of liquid crystal inversion can be achieved without increasing a driving frequency of a liquid crystal light control element.

[Solution] a liquid crystal light control element having a plurality of liquid crystal layers sandwiched between two electrodes serving as electrodes at both ends and arranged side by side in a direction of an optical axis of transmitted light is driven. In this case, a driving signal inverted at predetermined intervals is applied to the electrodes at both ends of each of the liquid crystal layers. By setting the driving signals of the plurality of systems as signals shifted from an in-phase or reversed-phase relationship, so the inversion timing of each liquid crystal layer is made not to coincide.

20 Claims, 10 Drawing Sheets

(51) Int. Cl.
  *G03B 11/00*    (2006.01)
  *H04N 5/232*    (2006.01)
  *H04N 9/04*     (2006.01)
  *H04N 5/225*    (2006.01)
  *G02F 1/1347*   (2006.01)
  *G02F 1/133*    (2006.01)
  *G02F 1/1343*   (2006.01)
  *G03B 9/08*     (2006.01)
  *H04N 5/235*    (2006.01)
  *G03B 17/14*    (2006.01)

(52) U.S. Cl.
  CPC .... *G02F 1/13471* (2013.01); *G02F 1/134309* (2013.01); *G03B 9/08* (2013.01); *G03B 11/00* (2013.01); *H04N 5/2254* (2013.01); *H04N 5/238* (2013.01); *H04N 5/2353* (2013.01); *H04N 5/232411* (2018.08); *H04N 9/045* (2013.01); *G03B 17/14* (2013.01)

(56) References Cited

FOREIGN PATENT DOCUMENTS

| | | |
|---|---|---|
| CN | 102934166 A | 2/2013 |
| CN | 103477269 A | 12/2013 |
| JP | 2002-082358 A | 3/2002 |
| JP | 2003-195255 A | 7/2003 |
| JP | 2007-101606 A | 4/2007 |
| JP | 2012-212078 A | 11/2012 |

\* cited by examiner

A — LIQUID CRYSTAL LIGHT CONTROL ELEMENT IN OFF

B — LIQUID CRYSTAL LIGHT CONTROL ELEMENT IN ON

LIGHT CONTROL DRIVING DEVICE, IMAGING APPARATUS, AND LIGHT CONTROL DRIVING METHOD

TECHNICAL FIELD

The present technology relates to a technical field of a light control driving device and a light control driving method for a liquid crystal light control element, and an imaging apparatus having the liquid crystal light control element.

CITATION LIST

Patent Literature

Patent Literature 1: JP 2002-082358A

BACKGROUND ART

An imaging apparatus, which is widespread as a digital still camera, a video camera, or the like, include a lens and an image sensor provided on the optical axis of the lens. A light control element is provided between these lens and image sensor, which allows the quantity of light directed from the lens to the image sensor to be adjusted.

One example of the light control element is a liquid crystal light control element. In the imaging apparatus equipped with the liquid crystal light control element, it is possible to vary ND levels in stepless and to perform the automatic light control depending on various conditions.

The above-mentioned Patent Literature 1 discloses the configuration and operation of the liquid crystal light control device and the imaging apparatus.

DISCLOSURE OF INVENTION

Technical Problem

By the way, the liquid crystal is recognized commonly as being driven by an alternating current. Specifically, alternate application of positive and negative voltages to electrodes at both ends of the liquid crystal layer prevents bias of positive and negative charges at the electrodes at both ends and shortening of the lifetime from occurring.

In the liquid crystal light control element, if a driving frequency as the alternating current driving is high, power consumption increases and charging capacity to the liquid crystal decreases. This decrease in the charging capacity causes a reduction of the concentration range.

Further, a condition like noise occurs in which the quantity of light control (quantity of transmitted light) differs slightly from a preset value for a moment at the inversion timing during the alternating current driving due to properties of the liquid crystal. In the case where the imaging apparatus is equipped with the liquid crystal light control element, if the driving frequency is low, the degradation in image quality such as streaks or unevenness occurring in a captured image due to noise at the time of inversion of the liquid crystal becomes conspicuous, which is although related to the shutter speed.

Thus, the present disclosure is intended desirably to eliminate or reduce the problems caused by such fluctuation in the driving frequency at high or low.

Solution to Problem

An imaging apparatus according to the present technology includes: a liquid crystal light control element that has a plurality of liquid crystal layers sandwiched between two electrodes serving as electrodes at both ends and arranged side by side in a direction of an optical axis of transmitted light, and allows a driving signal that is inverted at a predetermined interval to be applied to the electrodes at both ends of each of the liquid crystal layers, each driving signal being set as a signal whose phase is shifted from an in-phase or reversed-phase relationship.

The liquid crystal light control device has a plurality of independent liquid crystal layers whose transmittance is controlled by a driving signal applied to electrodes at both ends. In this case, the phase of the driving signal for each liquid crystal layer is shifted from the in-phase or reversed-phase relationship, so the inversion timing of each alternating current driven liquid crystal layer is set to be shifted.

In the above-described light control driving device according to the present technology, the liquid crystal light control element includes two liquid crystal layers, and each of the driving signals applied to the electrodes at both ends of each of the liquid crystal layers is set as a signal whose phase is shifted by 90°.

By setting each driving signal as a signal whose phase is shifted by 90°, the inversion timings of the two liquid crystal layers are shifted equally.

In addition, each of the driving signals is a signal that changes transmittance of the liquid crystal layer using an amplitude level.

In addition, a plurality of timing signals whose phases are shifted from the in-phase or reversed-phase relationship are generated, and the driving signal for each of the liquid crystal layers is generated using an amplitude signal corresponding to transmittance of each of the liquid crystal layers and the plurality of timing signals.

In addition, in particular, the driving signal for each of the liquid crystal layers is generated using the plurality of timing signals with respect to the amplitude signal generated in common for the respective liquid crystal layers. This achieves simple configuration.

An imaging apparatus according to the present technology includes: a liquid crystal light control element that has a plurality of liquid crystal layers sandwiched between two electrodes serving as electrodes at both ends and arranged side by side in a direction of an optical axis of transmitted light; and a light control driving unit configured to apply a driving signal that is inverted at a predetermined interval to the electrodes at both ends of each of the liquid crystal layers of the liquid crystal light control element, each driving signal being set as a signal whose phase is shifted from an in-phase or reversed-phase relationship.

In other words, in the imaging apparatus, the phase of the driving signal for each liquid crystal layer of the liquid crystal light control element is set to be shifted, so the inversion timing of each alternating current driven liquid crystal layer is dispersed.

For example, the liquid crystal light control element includes two liquid crystal layers, and the light control driving unit sets each of the driving signals that is applied to the electrodes at both ends of each of the liquid crystal layers of the liquid crystal light control element as a signal whose phase is shifted by 90°. This allows the inversion timings of the two liquid crystal layers to be shifted equally.

In addition, each of the driving signals that is applied to the liquid crystal light control element by the light control driving unit is a signal that changes transmittance of the liquid crystal layer using an amplitude level.

The imaging apparatus according to the present technology described above includes the liquid crystal light control element arranged in the path of incident light, and the image sensor that photoelectrically converts light incident through the liquid crystal light control element to generate a captured image signal.

This allows, in the case where the light incident on the image sensor is adjusted by the liquid crystal light control element, the inversion timing of each liquid crystal layer of the liquid crystal light control element to be dispersed from the inversion timing of the frequency of the driving signal.

It is conceivable that the imaging apparatus according to the present technology described above includes a mounting portion for mounting an interchangeable lens and an image sensor for photoelectrically converting light incident through the liquid crystal light control element to generate a captured image signal, and the mounting portion, the liquid crystal light control element, and the image sensor have positional relationship in such a way as to be arranged in this order as viewed from a photographic subject in a direction of an optical axis of incident light.

In other words, the light control element is arranged in the main body of the imaging apparatus on which the interchangeable lens is mounted. Then, in mounting the interchangeable lens on the mounting portion, the liquid crystal light control element is arranged in such a way as to adjust the incident light that is incident through a lens system included in the interchangeable lens.

In the imaging apparatus according to the present technology described above, the liquid crystal light control element is conceivable to be retractable from the path of incident light. This retraction of the liquid crystal light control element makes it possible to maximize its transmittance.

Further, in the imaging apparatus according to the present technology described above, it is conceivable that the clear glass is inserted into the path of incident light in the state in which the liquid crystal light control element is retracted. This insertion of the clear glass 82 into the path of incident light allows the state that is similar to the optical state of the case where the liquid crystal light control element is in the path to be obtained.

The light control driving method according to the present technology is a method of driving a liquid crystal light control element having a plurality of liquid crystal layers sandwiched between two electrodes serving as electrodes at both ends and arranged side by side in a direction of an optical axis of transmitted light by applying a driving signal, which is inverted at predetermined intervals and is shifted from an in-phase or reversed-phase relationship, to the electrodes at both ends of each of the liquid crystal layers.

Advantageous Effects of Invention

According to the present technology, it is possible to reduce the power consumption and to obtain the allowable charging time by using the driving signal at a relatively low frequency, thereby reducing the degradation in quality of a captured image.

Moreover, the effects described herein are not necessarily restrictive, and any advantageous effects described in the present disclosure can be taken.

MODE(S) FOR CARRYING OUT THE INVENTION

An embodiment will be described below in the following order.
<1. Imaging Apparatus According to Embodiment>
<2. Internal Configuration>
<3. Configuration and Operation of Light Control Driving Unit>
<4. Other Configuration Examples>
<5. Closing Remarks and Modifications>

1. Imaging Apparatus According to Embodiment

First, various configuration examples of an imaging apparatus according to an embodiment will be briefly described.

Figure 1:
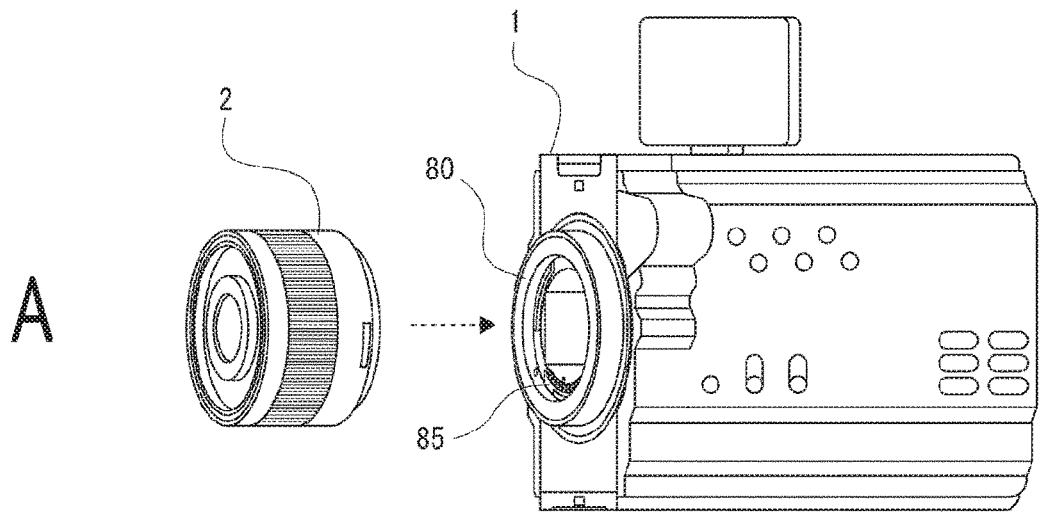
FIG. 1 is a diagram illustrated to describe an Imaging apparatus according to an embodiment of the present technology.
Figure 1:
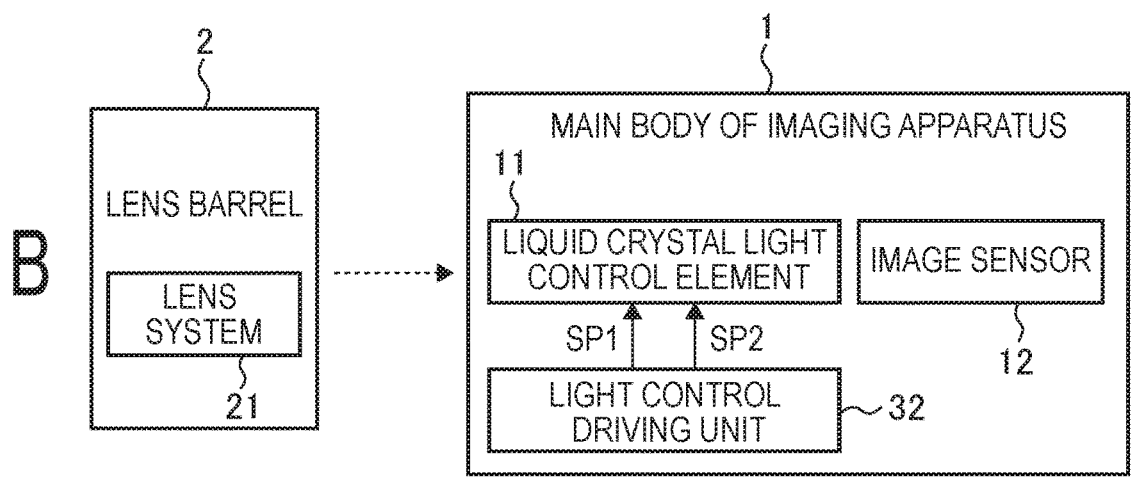
Figure 1:
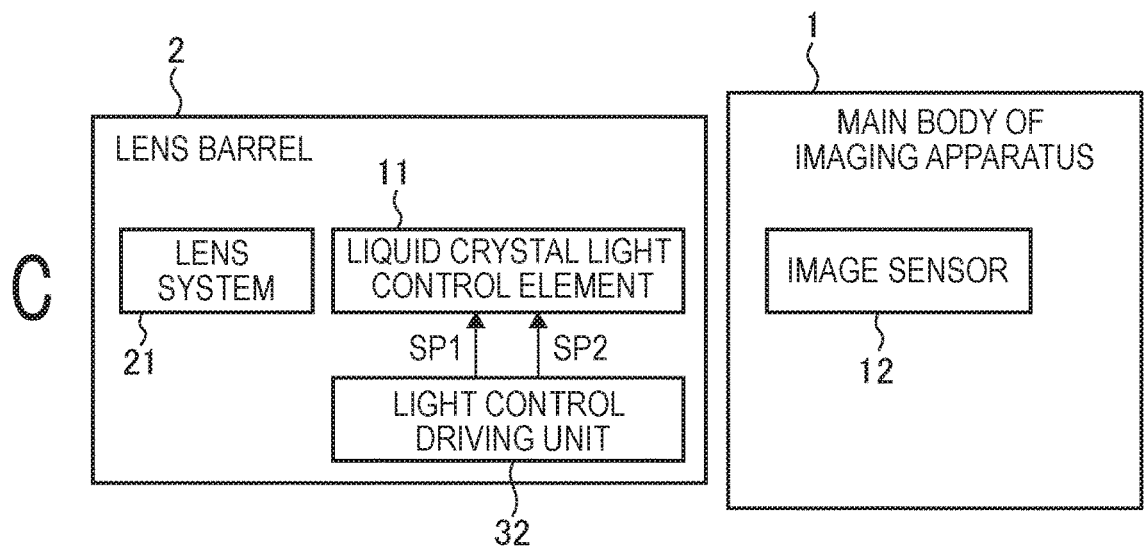

FIG. 1A illustrates an imaging apparatus 1 and a lens barrel 2 as one of interchangeable lenses that is mountable on the imaging apparatus 1. The appearance shape of the illustrated imaging apparatus 1 and the lens barrel 2 is merely an example. As one of modes of the present embodiment, an interchangeable lens type video camera or digital still camera is considered.

FIG. 1B schematically illustrate the arrangement in which a liquid crystal light control element 11, an image sensor 12, and a light control driving unit 32 for driving the liquid crystal light control element 11 are arranged in the camera main body of the imaging apparatus 1. Although will be described in detail later, the liquid crystal light control element 11 has two liquid crystal layers, and the light control driving unit 32 provides each liquid crystal layer with liquid crystal driving signals SP1 and SP2 so that the transmittance of each liquid crystal layer is controlled.

On the side of the lens barrel 2, a lens system 21 including optical components such as a plurality of lenses having a zoom lens and a focus lens is provided. The present embodiment employs a configuration in which, when the lens barrel 2 is mounted on the imaging apparatus 1, the light incident through the lens system 21 is adjusted by the liquid crystal light control element 11 on the side of the imaging apparatus 1 and is received by the image sensor 12.

FIG. 1C illustrates an example in which the lens system 21, the liquid crystal light control element 11, and the light control driving unit 32 are arranged on the side of the lens barrel 2, and the image sensor 12 is arranged on the main body side of the imaging apparatus 1.

In this case, a similar configuration is used in which, when the lens barrel 2 is mounted on the imaging apparatus 1, the light incident through the lens system 21 is adjusted by the liquid crystal light control element 11 and is received by the image sensor 12.

Figure 2:
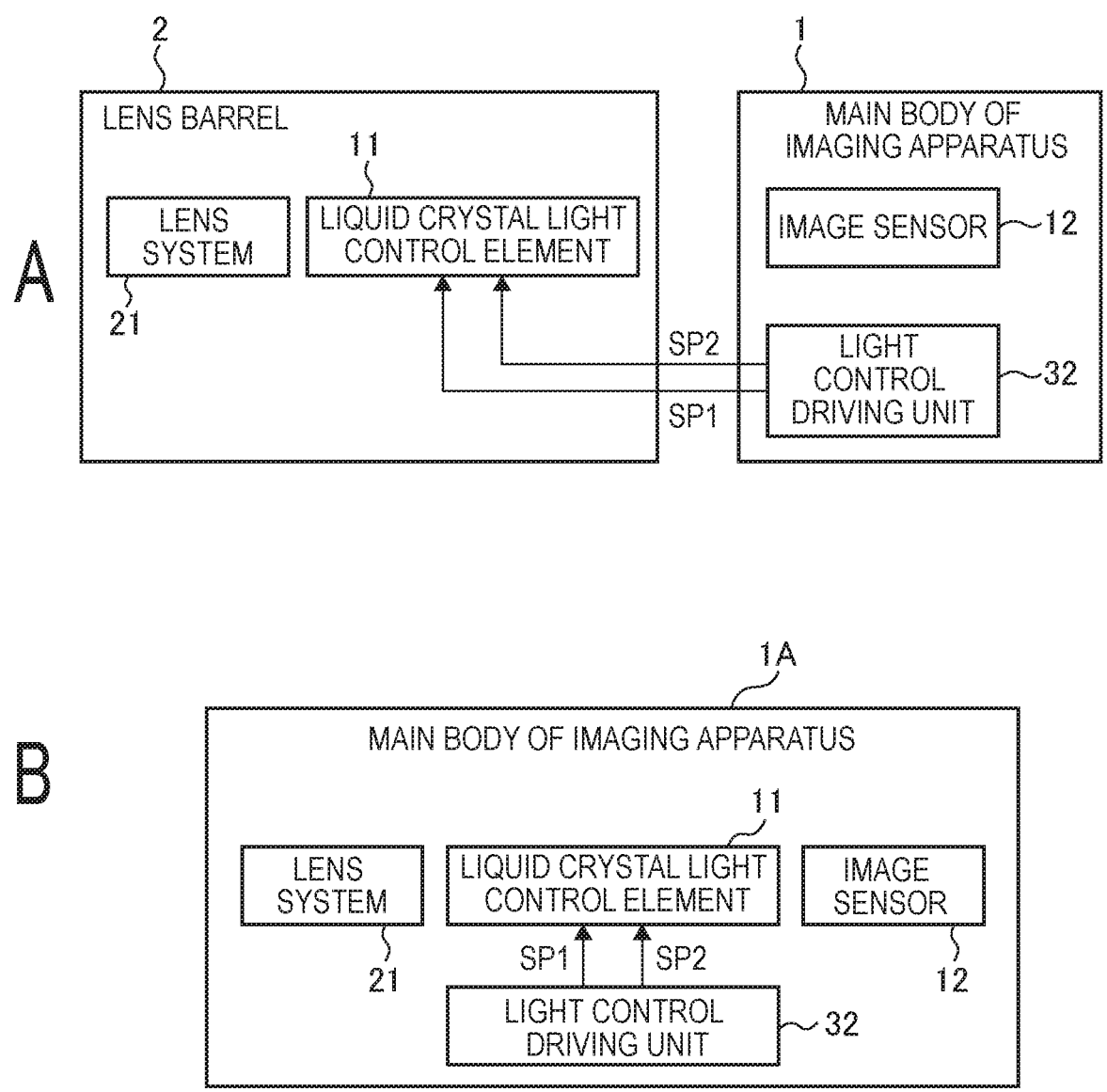
FIG. 2 is a diagram illustrated to describe the imaging apparatus according to the embodiment.

FIG. 2A illustrates an example in which the lens system 21 and the liquid crystal light control element 11 are arranged on the side of the lens barrel 2, and the image sensor 12 and the light control driving unit 32 are arranged on the main body side of the imaging apparatus 1. This allows the liquid crystal driving signals SP1 and SP2 to be supplied from the light control driving unit 32 to the liquid crystal light control element 11 by mounting the lens barrel 2 on the image sensor 12.

FIG. 2B illustrates a case where an imaging apparatus 1A is not an interchangeable lens type but a fixed lens type, and such a fixed lens type imaging apparatus 1A is also regarded as one of modes according to the present embodiment.

It is apparent that in this case the lens system 21, the liquid crystal light control element 11, the image sensor 12, and the light control driving unit 32 are all arranged in the main body of the imaging apparatus 1.

The embodiment will be described in detail below with reference to the configuration example of FIG. 1B.

Figure 3:
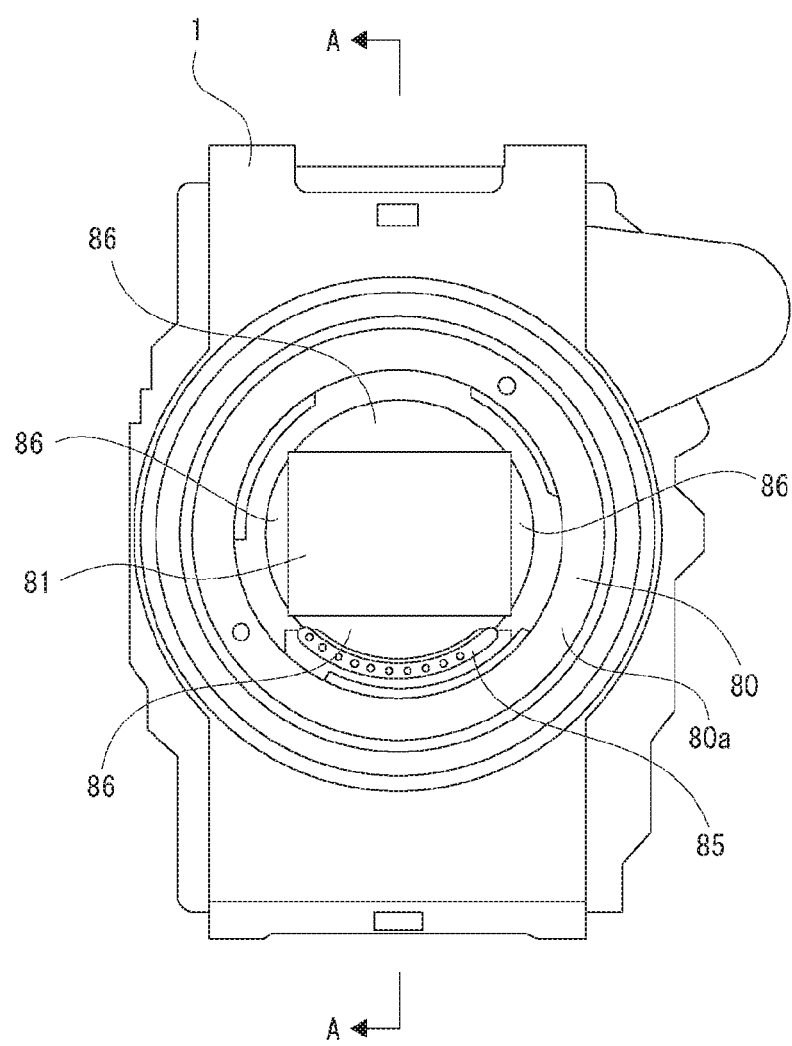
FIG. 3 is a front view of a state in which an interchangeable lens of the imaging apparatus according to the embodiment is removed.
Figure 4:
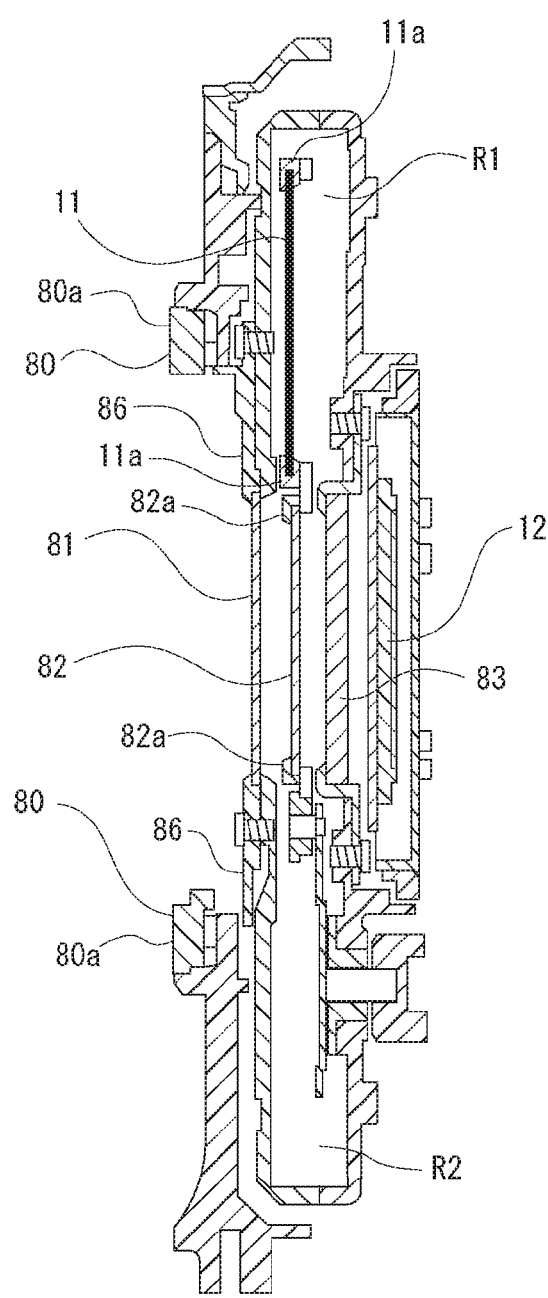
FIG. 4 is a cross-sectional view illustrating an arrangement of a liquid crystal light control element of the imaging apparatus according to the embodiment.
Figure 4:
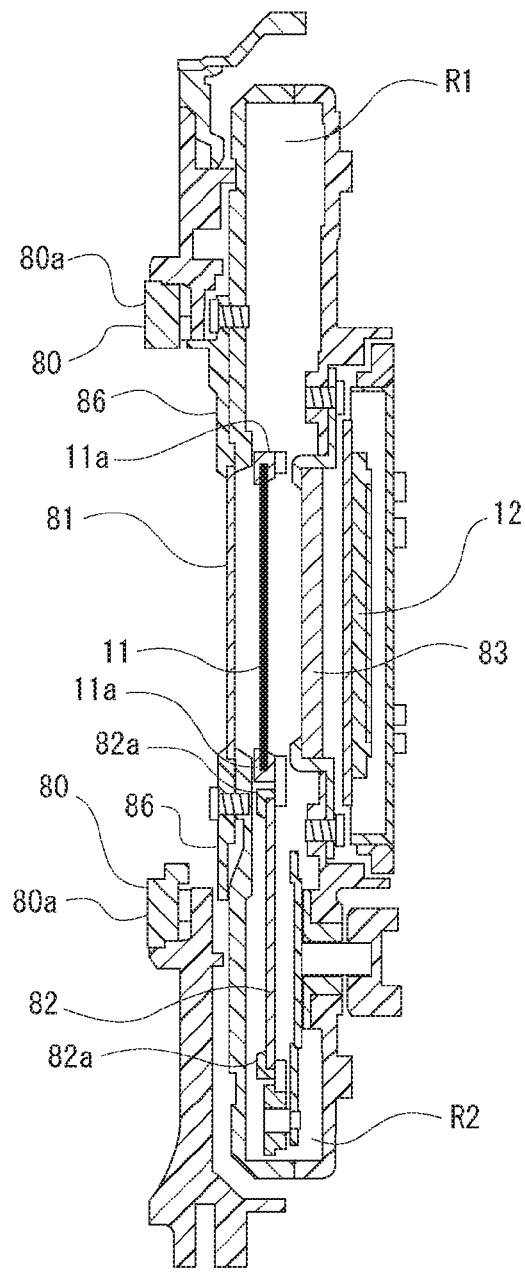

FIG. 3 is a front view of the imaging apparatus 1, and FIGS. 4A and 4B illustrate an optical system portion including the image sensor 12 as a part of the cross sectional of line A-A of FIG. 3.

FIG. 3 is a front view of a state in which the lens barrel 2 is not mounted, and a mount portion 80 for mounting the lens barrel 2 protrudes toward the front side.

A terminal portion 85 is provided on the inner peripheral side along the mount ring 80a included in the mount portion 80. The terminal portion 85 is a plurality of electrical contacts and functions as a communication terminal for communicating with the lens barrel 2 to which the imaging apparatus 1 is connected. This lens barrel 2 corresponding to the imaging apparatus 1 is provided with electrical contacts that come into contact with the respective electrical contacts of the terminal portion 85 in the mounted state, and this contact state allows a communication channel to be formed between the imaging apparatus 1 and the lens barrel 2.

A cover glass 81 acting as an opening portion for incident light to pass therethrough is arranged on the inner peripheral side of the mount ring 80a. Moreover, this is merely an example, and there may be a configuration in which the cover glass 81 is not provided.

The periphery of the cover glass 81 serves as a mold portion 86 for shielding incident light. The structure illustrated in FIGS. 4A and 4B is arranged to be directed to the direction of an optical axis from the cover glass 81.

FIG. 4A illustrates an example of a state in which the liquid crystal light control element 11 is retracted from the path of incident light, and FIG. 4B illustrates an example of a state in which the liquid crystal light control element 11 is arranged in the path of incident light.

In one example, the liquid crystal light control element 11 is arranged as illustrated in FIG. 4B in a normal state, and so the light control function by the liquid crystal light control element 11 is performed. On the other hand, in a case where the quantity of incident light is desired to be increased, by retracting the liquid crystal light control element 11 as illustrated in FIG. 4A, the transmittance of approximately 100% can be achieved.

In the state of FIG. 4B, the cover glass 81, the liquid crystal light control element 11, an optical low pass filter 83, and the image sensor 12 are arranged in the order of the traveling direction of the incident light (direction of an optical axis). Moreover, the order in which the liquid crystal light control element 11 and the optical low pass filter 83 are arranged may be reversed.

In the state of FIG. 4A, the cover glass 81, a clear glass 82, the optical low pass filter 83, and the image sensor 12 are arranged in the order of the traveling direction of the incident light.

Moreover, the order in which the clear glass 82 and the optical low pass filter 83 are arranged may be reversed.

In this example, in the state of FIG. 4A, the liquid crystal light control element 11 is retracted to a space R1, and in the state of FIG. 4B, the clear glass 82 is retracted to a space R2.

The liquid crystal light control element 11, when being retracted as illustrated in FIG. 4A, moves to a position where its position in the optical axis is not overlapped with that of the cover glass 81, and after the movement, it is located in a position where its position in the optical axis is overlapped with at least the position in the optical axis of the mount ring 80a. Furthermore, in this state, the position in the direction of an optical axis of the liquid crystal light control element 11 is also overlapped with that of the mold portion 86.

The position in the direction of an optical axis of the liquid crystal light control element 11 in the retracted state is set to be overlapped with that of the mount ring 80a and the mold part 86 as viewed in the direction of an optical axis (viewed from the side of a photographic subject), so it is possible for the space R1 to be made small. In other words, when the liquid crystal light control element 11 is further retracted upward in the figure, it is necessary to widen the space R1 in the direction perpendicular to the optical axis. However, by setting the retracted position as the position as shown in the figure, it is possible to minimize the space R1.

In addition, in the state illustrated in FIG. 4B, the position in the direction of the optical axis of the clear glass 82 is overlapped with that of the mount ring 80a. Furthermore, in this state, the position in the direction of the optical axis of the mount ring 80a is also overlapped with that of the mold portion 86.

In this way, the position of the clear glass 82 in the retracted state is set to be overlapped with the mount ring 80a and the mold portion 86 as viewed from the direction of the optical axis (as viewed from the side of a photographic subject), so it is possible for the space R2 to be made smaller. In other words, when the clear glass 82 is further retracted upward and downward in the figure, it is necessary to widen the space R2 in the direction perpendicular to the optical axis, but by setting the retracted position as the position as shown in the figure, it is possible to minimize the space R2.

This example is based on the assumption that the clear glass 82 is arranged in the path of incident light when the liquid crystal light control element 11 is retracted from the path of incident light. This is because the optical state in the case where the liquid crystal light control element 11 is retracted from the path of incident light is to be similar to the optical state in the case where the liquid crystal light control element 11 is arranged in the path. Thus, the clear glass 82 has a function of matching the optical lengths with each other in consideration of the refractive index of the material.

Further, the liquid crystal light control element 11 is held by a holder 11a, and the clear glass 82 is held by a holder 82a. Then, in the state in which the holders 11a and 82a are connected, their interlocking movement in the vertical direction allows the liquid crystal light control element 11 to be inserted or retracted.

This mechanism makes it possible to perform the interlocked movement of the liquid crystal light control element 11 and the clear glass 82. In addition, this mechanism facilitates the mechanism for retracting and returning from the retraction of the liquid crystal light control element 11 or stabilizes the relocation operation between the optical element 11 and the clear glass 82 in the path of incident light.

Moreover, there may be a case where the retracting direction (retracted position) of the clear glass 82 is on the opposite side of 180 degrees from the retracting direction (retracted position) of the liquid crystal light control element 11 across the image sensor 12 or is retracted in a direction different by 90 degrees. Furthermore, there may be a case where the retracting direction (retracted position) of the clear glass 82 is the same in direction (position) as the retracting direction (retracted position) of the liquid crystal light control element 11.

2. Internal Configuration

Figure 5:
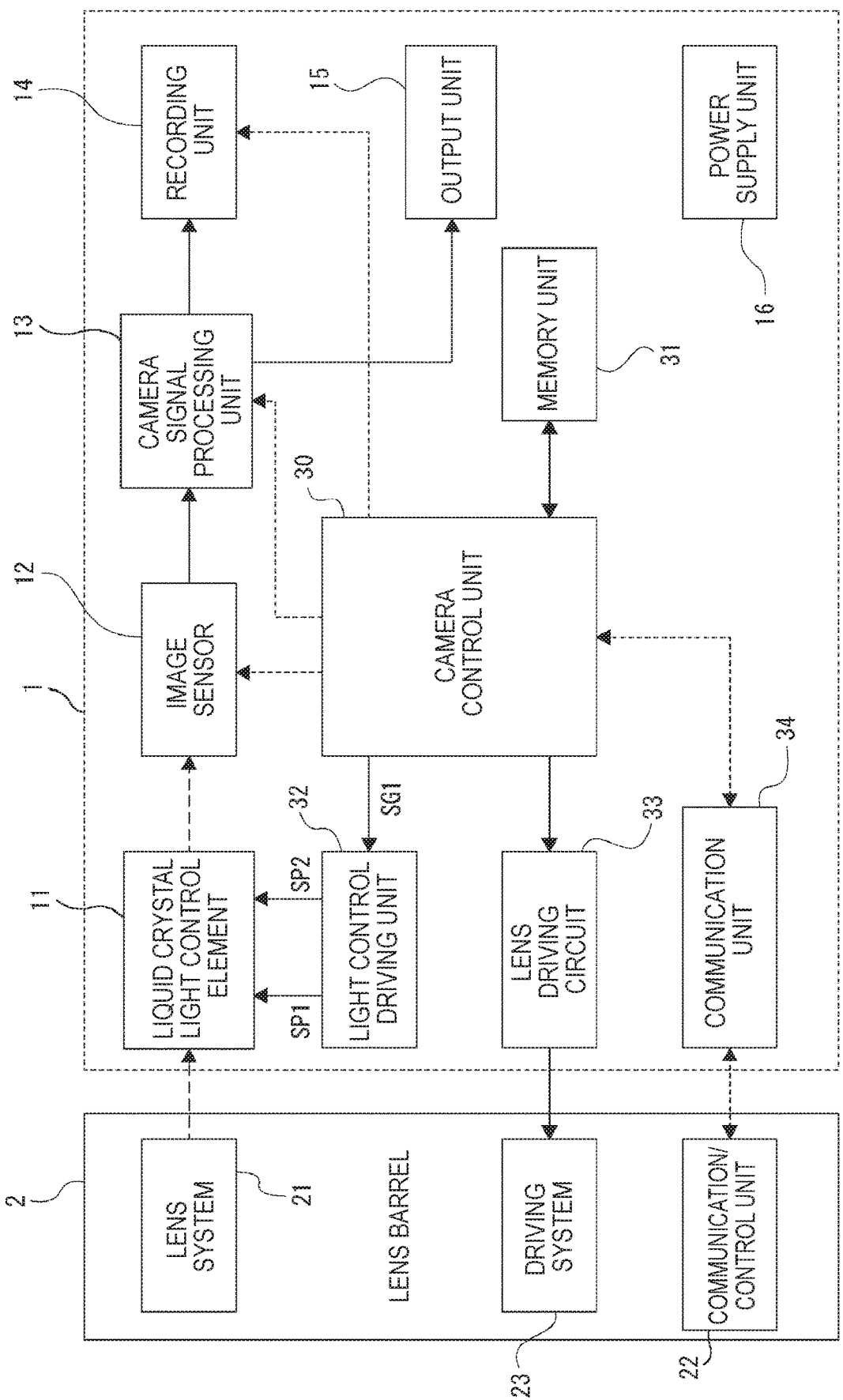
FIG. 5 is a block diagram of the internal configuration of the imaging apparatus according to the embodiment.

FIG. 5 illustrates the internal configuration of the imaging apparatus 1 according to the embodiment, and also illustrates the lens barrel 2 that is mounted on the imaging apparatus 1.

The imaging apparatus 1 includes the liquid crystal light control element 11, the image sensor (imager) 12, a camera signal processing unit 13, a recording unit 14, an output unit 15, a power supply unit 16, a camera control unit 30, a memory unit 31, the light control driving unit 32, a lens driving circuit 33, and a communication unit 34.

Moreover, although not shown in the figure, it is common that a configuration for a user interface such as a display unit and an operation unit is provided.

The lens system 21 in the lens barrel 2 includes lenses such as a cover lens, a zoom lens, or a focus lens, and a diaphragm mechanism. This lens system 21 allows light (incident light) from a photographic subject to be guided and to be focused on the image sensor 12 through the liquid crystal light control element 11 in the imaging apparatus 1.

The liquid crystal light control element 11 adjusts the light quantity of the incident light. The configuration of the liquid crystal light control element 11 will be described later.

The image sensor 12 is configured as, in one example, a charge-coupled device (CCD) type, a complementary-metal-oxide semiconductor (CMOS) type, or the like.

In this image sensor 12, the electric signal obtained by photoelectric conversion of the received light is subjected to, in one example, the correlated double sampling (CDS) processing, the automatic gain control (AGC) processing, or the like, and the analog-to-digital (A/D) conversion processing is further performed on it. Then, a captured image signal as digital data is output to the camera signal processing unit 13 at the subsequent stage.

The camera signal processing unit 13 is configured as an image processing processor such as, in one example, a digital signal processor (DSP). This camera signal processing unit 13 performs various signal processing on the digital signal (captured image signal) from the image sensor 12. In one example, the camera signal processing unit 13 performs preprocessing, synchronization processing, YC generation processing, resolution conversion processing, codec processing, or the like.

In the preprocessing, the clamp processing for clamping the black level of R, G, and B to a predetermined level or the correction processing between color channels of R, G, and B is performed on the captured image signal from the image sensor 12. In addition, in the preprocessing, the correction processing for correcting shading occurring by capturing incident light through the liquid crystal light control element 11 or the correction processing for correcting shading caused by the lens system 21 is also performed.

In the synchronization processing, the demosaicing processing is performed so that image data of each pixel has R, G, and B color components.

In the YC generation processing, luminance (Y) and chrominance (C) signals are generated (separated) from image data of R, G, and B.

In the resolution conversion processing, the resolution conversion processing is executed on image data that is subjected to various signal processing.

In the codec processing, in one example, the coding processing for recording or communication is performed on the resolution-convened image data.

The recording unit 14 is configured as, in one example, a nonvolatile memory, and stores an image file (content tile) such as still image data or moving image data, attribute information of the image file, a thumbnail image, or the like.

The image file is stored, in one example, in a format including joint photographic experts group (MEG), tagged image file format (TIFF), graphics interchange format (GIF), or the like.

Various forms of implementing the recording unit 14 are considered. In one example, the recording unit 14 may be a flash memory built in the imaging apparatus 1. Alternatively, the recording unit 14 may have a form including a memory card (e.g., a portable flash memory) detachable from the imaging apparatus 1 and a card recording and reproducing unit for performing an access for recording and reproduction on the memory card. In addition, it may be implemented as a hard disk drive (HDD) or the like that is a form built in the imaging apparatus 1.

The output unit 15 performs data communication or network communication with an external device by wire or wireless.

In one example, the captured image data (still image file or moving image file) is transmitted as an output to an external display device, a recording device, a reproduction device, or the like.

In addition, the output unit 15 serves as a network communication unit, and so it may be configured to perform communication via various networks such as the Internet, a home network, or a local area network (LAN) and to perform transmission or reception of various data to or from a server, a terminal, or the like on a network.

The power supply unit 16 generates a power supply voltage necessary for each component by setting a voltage of a built-in battery or a direct current converted and input by an AC adapter connected to a commercial alternating current power supply, and supplies it as an operation voltage.

The camera control unit 30 is constituted by a microcomputer (arithmetic processing unit) having a central processing unit (CPU).

The memory unit 31 stores information or the like that is used for the processing to be performed by the camera control unit 30. In one example, it may be any of a read only memory (ROM), a random access memory (RAM), a flash memory, and the like. The memory unit 31 may be a memory area built in a microcomputer chip as the camera control unit 30, or may be constituted by a separate memory chip.

The camera control unit 30 centrally controls the entire imaging apparatus 1 by executing programs stored in a ROM, a flash memory, or the like of the memory unit 31.

In one example, the camera control unit 30 controls operations of necessary components including the control of a shutter speed of the image sensor 12, the instruction of various signal processing in the camera signal processing unit 13, the shooting or recording operation in response to the user's operation, the reproduction operation of a recorded image file, the camera operation such as zooming, focusing, and exposure adjustment, the user interface operation, or the like.

The RAM in the memory unit 31 serves as a working area when various data of the CPU is processed and is used for temporarily storing data, programs, or the like.

The ROM or the flash memory (nonvolatile memory) in the memory unit 31 is used to store application programs for various operations, firmware, or the like in addition to an operating system (OS) for the CPU to control each component or a content file such as an image file.

Further, in this example, in one example, a correction table for correction of shading, which will be described later, is stored in the flash memory.

The light control driving unit 32 drives the liquid crystal light control element using the liquid crystal driving signals SP1 and SP2 to change its transmittance. The light control driving unit 32 sets the amplitude levels of the liquid crystal driving signals SP1 and SP2, in one example, on the basis of the light-control control signal SG1 indicating the brightness from the camera control unit 30, and outputs the amplitude levels to the liquid crystal light control element 11.

Moreover, the reason why two-type liquid crystal driving signals are used as the liquid crystal driving signals SP1 and SP2 is that the liquid crystal light control element 11 has a two-layer structure as described later and drives each liquid crystal layer.

The lens driving circuit 33 outputs a driving signal for a driving system 23 of the lens barrel 2 on the basis of an instruction from the camera control unit 30. The driving system 23 of the lens barrel 2 includes, in one example, a motor for driving a focus lens or a zoom lens in the lens system 21, a motor for driving the diaphragm mechanism, or the like. The lens driving circuit 33 outputs a driving signal for these motors and causes a necessary operation in the lens barrel 2 to be executed.

The communication unit 34 performs communication with the lens barrel 2.

The lens barrel 2 is equipped with, in one example, a communication/control unit 22 including a microcomputer, and so the camera control unit 30 is capable of performing communication of various data with the communication/control unit 22 through the communication unit 34. In one example, the communication through the communication unit 34 makes it possible for the camera control unit 30 to acquire information such as a position of the zoom lens, a position of the focus lens, an exit pupil distance, an aperture value, or the like of the lens system 21 in the lens barrel 2.

Moreover, the communication between the communication unit 34 and the communication/control unit 22 or the supply of the motor driving signal from the lens driving circuit 33 to the drive system 23 is performed by wired connection through the terminal portion 85 (and a terminal portion (not shown) on the side of the lens barrel 2) illustrated in FIG. 3.

The description will be given of the liquid crystal light control element 11 equipped in the imaging apparatus 1 described above.

The liquid crystal light control element 11 is a light control device using a guest-host (GH) type liquid crystal cell.

Figure 6:
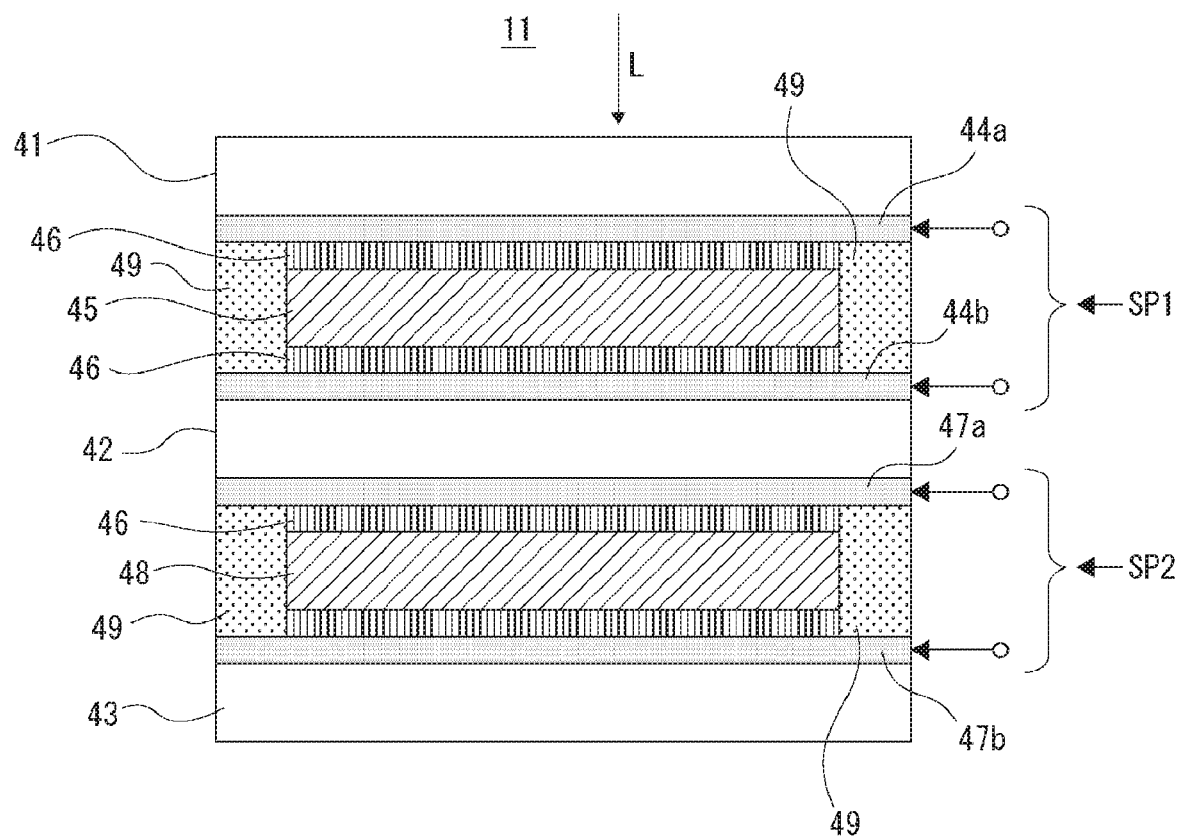
FIG. 6 is a diagram illustrated to describe a liquid crystal light control element according to an embodiment.

FIG. 6 illustrates the structure of the liquid crystal light control element 11.

The liquid crystal light control element 11 is provided with glass substrates 41, 42, and 43, and has two liquid crystal layers 45 and 48 in the traveling direction (arrow L) of light to be adjusted.

First, the glass substrates 41 and 42 are arranged with a sealing material 49 as shown in the figure, and the one liquid crystal layer 45 is formed between them. Transparent electrode films 44a and 44b serving as electrodes at both ends of the liquid crystal layer 45 are provided on the sides of the liquid crystal layers of each of the glass substrates 41 and 42. In addition, alignment films 46 and 46 are provided on both sides of the liquid crystal layer 45.

Further, the glass substrates 42 and 43 are also arranged with the sealing material 49 as shown in the figure, and the other liquid crystal layer 48 is formed between them. Transparent electrode films 47a and 47b serving as electrodes at both ends of the liquid crystal layer 48 are provided on the sides of the liquid crystal layer of each of the glass substrates 42 and 43. In addition, alignment films 46 and 46 are provided on both sides of the liquid crystal layer 48.

In one example, the sealing material 49 seals the liquid crystal layers 45 and 48 from the side surface. The sealing member 49 includes an adhesive such as an epoxy adhesive or an acrylic adhesive.

Moreover, FIG. 5 illustrates the structure in the cross-sectional direction, but the liquid crystal light control element 11 further includes a sealing portion and a spacer, which are not shown.

The spacer is, in some cases, arranged to keep the cell gap of the liquid crystal layers 45 and 48 constant. In one example, a resin material, a glass material, or the like is used.

The sealing portion is an enclosing port in sealing the liquid crystal, and then the liquid crystal is sealed from the outside.

In the liquid crystal light control element 11, the alignment film 46 includes, in one example, a polymer material such as polyimide and is subjected to the rubbing processing in a predetermined direction in advance, thereby setting the alignment direction of the liquid crystal molecules.

The liquid crystal layers 45 and 48 contain predetermined dye molecules (dichroic dye molecules) in addition to guest-host type liquid crystal molecules. The GH type liquid crystal has a negative type and a positive type depending on the difference in the major axis direction of liquid crystal molecules at the time of application of voltage. In one example, in the positive GH type liquid crystal, when the voltage is not applied (OFF state), the major axis direction of the liquid crystal molecules is perpendicular to the optical axis, and when the voltage is applied (ON state), the major axis direction of the liquid crystal molecules is parallel to the optical axis.

Each of the two liquid crystal layers 45, 48 of the liquid crystal light control element 11 has upper and lower electrodes (transparent electrode films 44a and 44b and transparent electrode films 47a and 47b), and they are driven by a total of four signals. In other words, the positive electrode level and the negative electrode level of the liquid crystal driving signal SP1 are applied, and the positive electrode level and the negative electrode level of the liquid crystal driving signal SP2 are applied.

Alternating current inversion is necessary for achieving the durability of the liquid crystal, and two-phase clocks are supplied to the two electrodes of each of the liquid crystal layers 45 and 48. In other words, the liquid crystal driving signal SP1 that is regarded as the clock pulse of a certain frequency and the inverted signal are applied to the transparent electrode films 44a and 44b. In addition, the liquid crystal driving signal SP2 that is regarded as the clock pulse of a certain frequency and the inverted signal are similarly applied to the transparent electrode films 47a and 47b.

The transmittance of the liquid crystal light control element 11 supplied with the liquid crystal driving signals SP1 and SP2 having a certain frequency and amplitude increases as the amplitude increases, depending on types of liquid crystal, or alternatively, the transmittance decreases as the amplitude increases.

In other words, the camera control unit 30 supplies the light-control control signal SG1 that is a value indicating the brightness to the light control driving unit 32, and the light control driving unit 32 outputs the liquid crystal driving signals SP1 and SP2 having the amplitude in response to the indication. Thus, the liquid crystal light control element 11 has variable transmittance, and the light control operation is executed.

Figure 7:
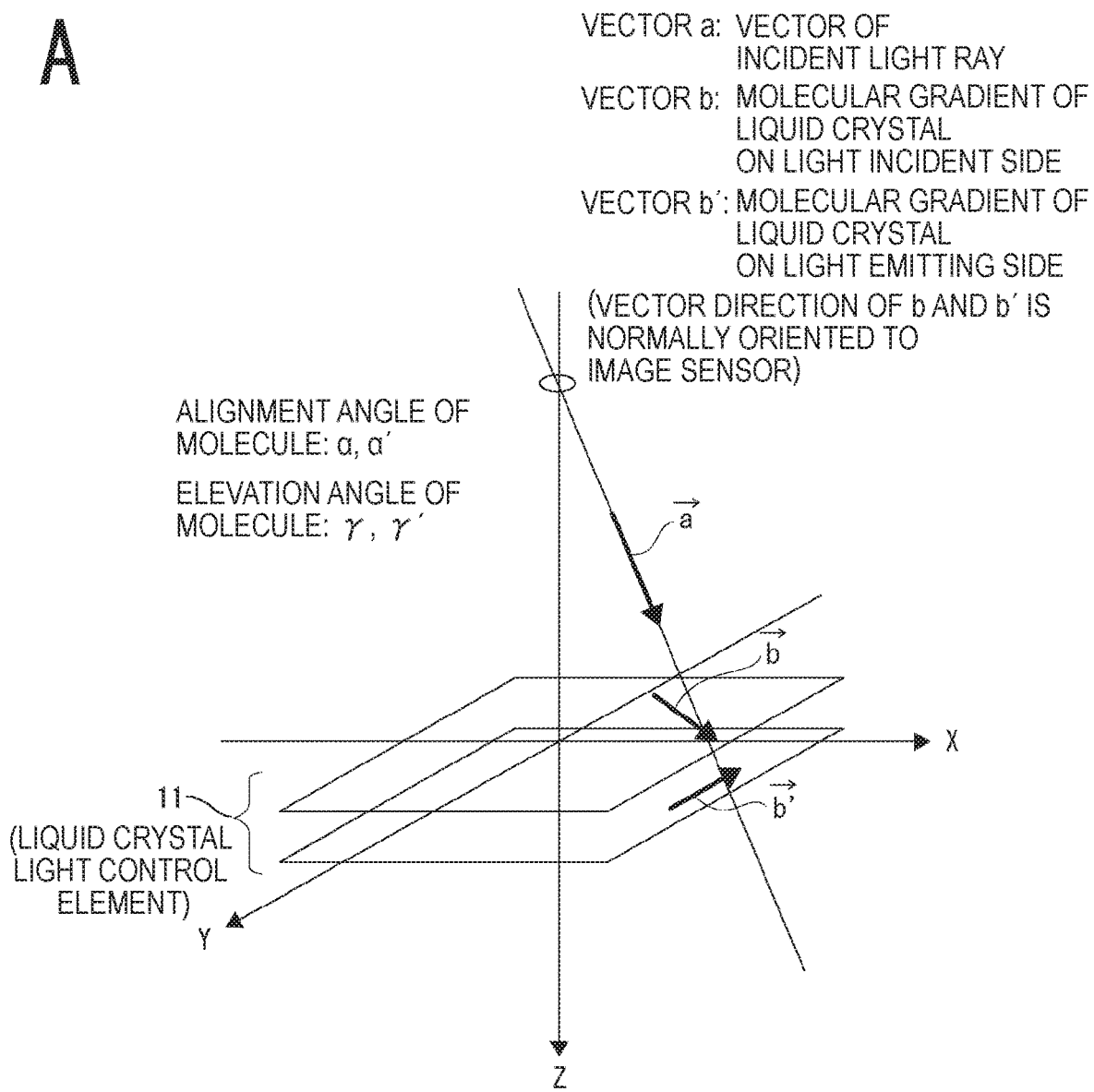
FIG. 7 is a diagram illustrated to describe the calculation of transmittance of the liquid crystal light control element according to the embodiment.
Figure 7:
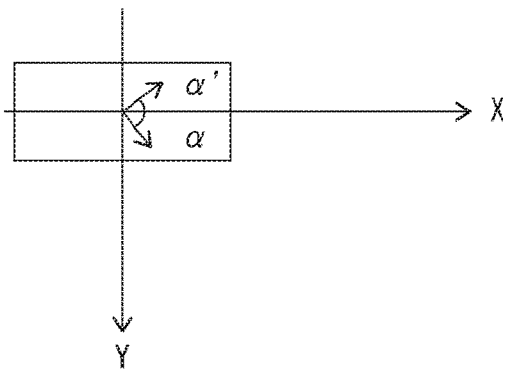
Figure 7:
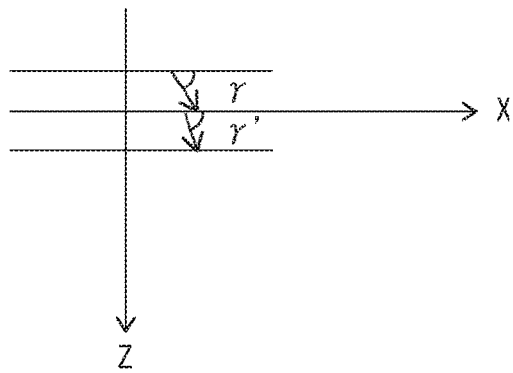

A calculation model of the transmittance of the liquid crystal light control element it is illustrated in FIG. 7A.

Each value is as follows:
Vector a: Vector of incident light ray
Vector b: Vector of liquid crystal molecules (dye) in the liquid crystal layer 45 on the light incident side
Vector b': Vector of liquid crystal molecules (dye) in the liquid crystal layer 48 on the light emitting side
Ii: Intensity of light ray
t: Transmittance at γ=90° of the liquid crystal layer 45 on the light incident side
t': Transmittance at γ'=90° of the liquid crystal layer 48 on the light emitting side
α: Light distribution angle of liquid crystal molecules on the light incident side
γ: Elevation angle of liquid crystal molecules on the light incident side
α': Light distribution angle of liquid crystal molecules on the light emitting side
γ': Elevation angle of liquid crystal molecules on the light emitting side Moreover, in FIG. 7B, α and α' are shown in the X-Y plane, and in FIG. 7C, γ and γ' are shown in the X-Z plane.

In this case, each vector is represented as follows.

$$\vec{a} = I_i \begin{pmatrix} x_i \\ y_i \\ z_i \end{pmatrix}$$ [Math. 1]

$$\vec{b} = t \begin{pmatrix} \cos\gamma\cos\alpha \\ \cos\gamma\sin\alpha \\ \sin\gamma \end{pmatrix}$$

$$\vec{b'} = t' \begin{pmatrix} \cos\gamma'\cos\alpha' \\ \cos\gamma'\sin\alpha' \\ \sin\gamma' \end{pmatrix}$$

Then, the intensity of a light ray transmitted through the dye is equal to the scalar product of the light ray vector and the dye vector, so the transmittance T of the liquid crystal light control element 11 is given by $$T = \vec{a} \cdot \vec{b} \times \vec{a} \cdot \vec{b'}$$

3. Configuration and Operation of Light Control Driving Unit

In the present embodiment, the phases of the liquid crystal driving signals SP1 and SP2 outputted from the light control driving unit 32 to the liquid crystal light control element 11 are made to be shifted from each other. This point will be described below.

Figure 8:
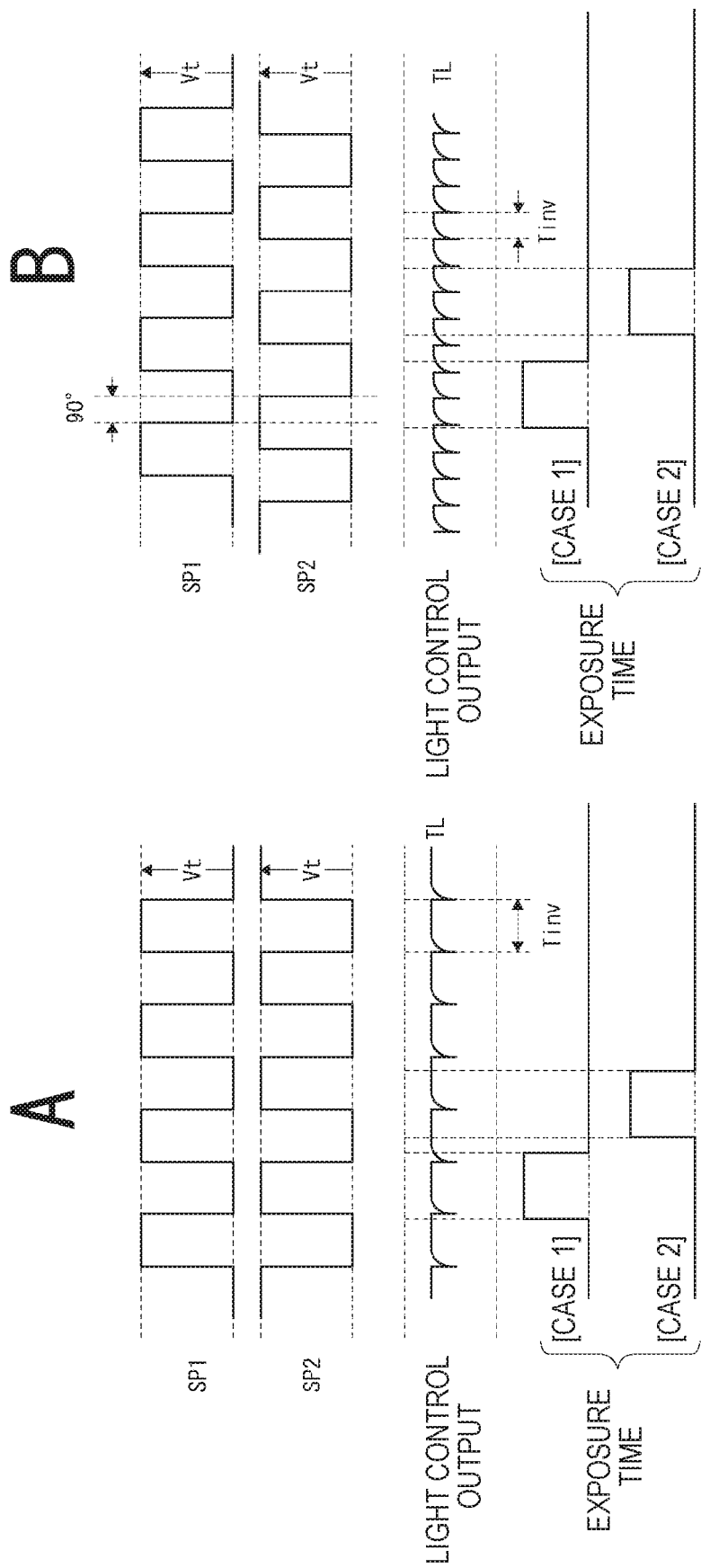
FIG. 8 is a diagram illustrated to describe a liquid crystal driving signal of the liquid crystal light control element according to the embodiment.

FIG. 8A illustrates a case where the liquid crystal driving signals SP1 and SP2 are generated in a normal way of thinking for comparison. Here, the liquid crystal driving signals SP1 and SP2 are in opposite phases (phase difference of 180°).

In one example, in the case of using the liquid crystal light control element 11 having the two-layer structure as illustrated in FIG. 6, like the liquid crystal driving signals SP1 and SP2 in FIG. 8A, the alternating current driving waveform of rectangular waves having an inverted amplitude voltage Vt at a clock of a specific frequency (assumed to be frequency fs1) is applied to the electrodes on both sides where the liquid crystal is sandwiched in such a manner that the phases are shifted by 180° (reversed phase) and so it is driven. In other words, the liquid crystal driving signal SP1 is applied to the transparent electrode films 44a and 44h such that the positive and negative electrodes are alternately switched. In addition, the liquid crystal driving signal SP2 is applied to the transparent electrode films 47a and 47b such that the positive and negative electrodes are alternately switched.

On the assumption of such a normal, driving method various possible events will be described.

In the liquid crystal light control element, alternating current driving is typically necessary, but when the driving frequency is high, the power consumption increases and the charging capability of liquid crystal decreases. Reduction in the charging capacity causes reduction in the concentration range.

Then, in cameras equipped with the liquid crystal light control element, recently there has been a demand for an increase in the size of the liquid crystal light control element as the size of the image sensor has increased, and it is desired to achieve the driving at a low frequency from the viewpoint of power saving and charging capability.

On the other hand, due to properties of the liquid crystal, a condition like noise occurs in which the quantity of light control differs slightly from a preset value for a moment at the inversion timing during the alternating current driving. In other words, FIG. 8A illustrates a light quantity level TL transmitted through the liquid crystal light control element as the light control output, but the transmitted light quantity instantaneously drops at every cycle Tinv depending on the inversion timing of the liquid crystal by the alternating current driving. This will be referred to as "noise" for the sake of description.

As described above, the transmittance of the liquid crystal light control element fluctuates in a direction in which the voltage is unlikely to be applied from the predetermined transmittance for a moment every time the alternating current inversion occurs in the time direction, that is, every cycle Tinv. The level of this fluctuation depends on the voltage-transmittance characteristics (VT characteristics) dependent upon the physical properties of the liquid crystal, the response speed, and the capacity of the liquid crystal light control element that affects the waveform at the time of inversion.

In view of the operation of the camera, such noise is not so serious as long as exposure is performed for a time period relatively longer relative to the cycle Tinv (=T1/2 [sec]) (where T1 is the cycle of fs1).

However, in the case of making the shutter speed ultra-high speed, the shift of the quantity of light control due to noise with respect to the exposure quantity is not negligible. In addition, the timing of noise is typically asynchronous with respect to each exposure time of the shutter, and so a difference in influence due to noise occurs at every exposure time, resulting in the degradation of image quality such as streaks and unevenness as camera output.

In one example, FIG. 8A illustrates the exposure times [Case 1] and [Case 2] in the case where the shutter speed is increased. It is assumed that the exposure is performed in the interval of H level.

Assuming that the shutter speed is 1/SS, the exposure time Tss becomes 1/SS [sec], but if Tss<Tinv×2, the variation in the transmittance fluctuation (inversion timing) at every exposure time becomes conspicuous, and causes horizontal streaks on the screen.

In the case of [Case 1], noise occurs twice within the exposure time, and in the case of [Case 2], noise occurs once within the exposure time.

In one example, in one frame of exposure, the exposure timing is shifted line by line. Then, in one frame, the line exposed in the period of [Case 1] and the line exposed in the period of [Case 2] are generated. In addition, if the exposure time becomes shorter, a line in which noise does not occur during exposure and a line in which noise occurs during exposure are generated.

As described above, the influence of noise significantly differs within one frame, and in the image, streaks, unevenness, or the like occurs, so the deterioration in image quality (uniformity deterioration) occurs.

In one example, even if the exposure time is long and a line where noise occurs ten times during exposure time and a line where noise occurs nine times occurs, the influence of noise is small or little. However, as in the example of FIG. 8A, in the case where a line where noise occurs twice and a line where noise occurs once occurs, the shift of the quantity of light control due to noise with respect to the exposure quantity is not negligible, which significantly affect the image quality.

As a measure against the deterioration in image quality, an approach is considered in which more noise is added to the exposure time to reduce variations in the amounts of noise for each exposure timing so that the deterioration in image quality is reduced below the visually recognizable level. In other words, the frequency of the liquid crystal driving signals SP1 and SP2 is increased so that noise occurs more frequently. In one example, the frequency of the liquid crystal driving signals SP1 and SP2 is set to fs2 (=2·fs1), and the noise occurrence cycle, that is, the inversion cycle Tinv of the liquid crystal is set to T2/2 [sec] (where T2 is the cycle of fs2).

Then, even if the exposure time is short, the number of times of occurrence of noise during the exposure cycle increases, and on the contrary, the change in the quantities of light due to noise is equalized, so visual deterioration in image quality does not occur. Depending on the exposure timing, the number of times of occurrence of noise within the exposure time may vary, but this has a small influence on the image quality.

Thus, the higher the driving frequency of the liquid crystal driving signals SP1 and SP2 for the liquid crystal light control element, the more advantageous.

However, increasing the driving frequency as described above is disadvantageous in terms of power consumption and charging capability.

Thus, in the present embodiment, in a case where driving at a certain frequency is necessary as a measure against noise, it is intended to achieve low power consumption and light control range (charging capacity).

Thus, when the driving frequency that does not cause deterioration in image quality (assumed to be visually not recognized as deterioration in image quality) is set to fs2, the liquid crystal driving signals SP1 and SP2 are driven at a frequency of ½, that is, at the frequency fs1, and the noise occurrence timing that is equivalent to the frequency fs2 is maintained while achieving low power consumption and charging capability.

Specifically, as illustrated in FIG. 8B, the phases of the liquid crystal driving signals SP1 and SP2 are set to be shifted.

The liquid crystal driving signals SP1 and SP2 are rectangular waves having an amplitude voltage Vt that is inverted by a clock of the frequency fs1, like with the case of FIG. 8A. Then, in this case, the phase is shifted by 90°.

The liquid crystal driving signal SP1 is applied to the transparent electrode films 44a and 44b such that the positive and negative electrodes are alternately switched. In addition, the liquid crystal driving signal SP2 is applied to the transparent electrode films 47a and 47b such that positive and negative electrodes are alternately switched.

Thus, in the liquid crystal light control element 11, the liquid crystal inversion timing of the liquid crystal layers 45 and 48 is shifted. The inversion cycle Tinv is equivalent to T2/2[sec] when (T1/2)/2 [sec], that is, the frequency fs2 is doubled.

Thus, as illustrated in FIG. 8B as a light control output, noise occurs at a cycle twice that in the case of FIG. 8A. FIG. 8B also illustrates the exposure times [Case 1] and [Case 2] in a similar manner to the case in FIG. 8A, but the number of times of occurrence of noise during the exposure time increases, thereby equalizing the influence of noise, which leads to reduction of the deterioration in uniformities on the screen.

In other words, the liquid crystal driving signals SP1 and SP2 are set as a signal of frequency fs1 that is appropriate in terms of power consumption and charging time, and the noise occurrence cycle is set to be equivalent to the case where the frequency fs2 that is twice the frequency is used, which leads to reduction of influence of noise on the image.

Figure 9:
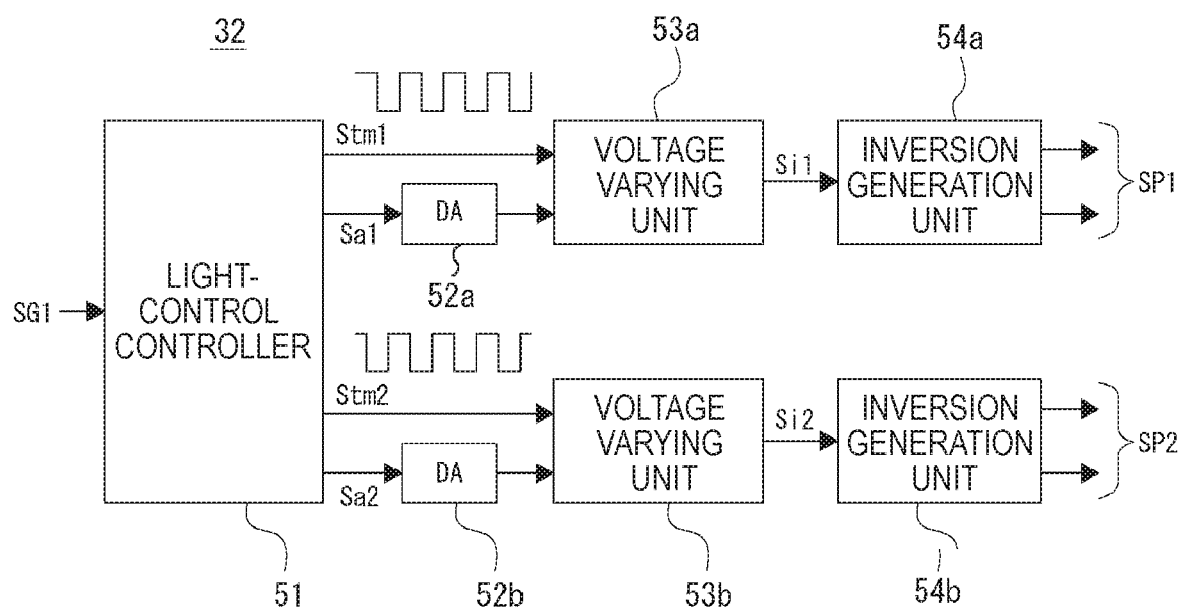
FIG. 9 is a block diagram of a configuration example of a light control driving unit according to the embodiment.
Figure 9:
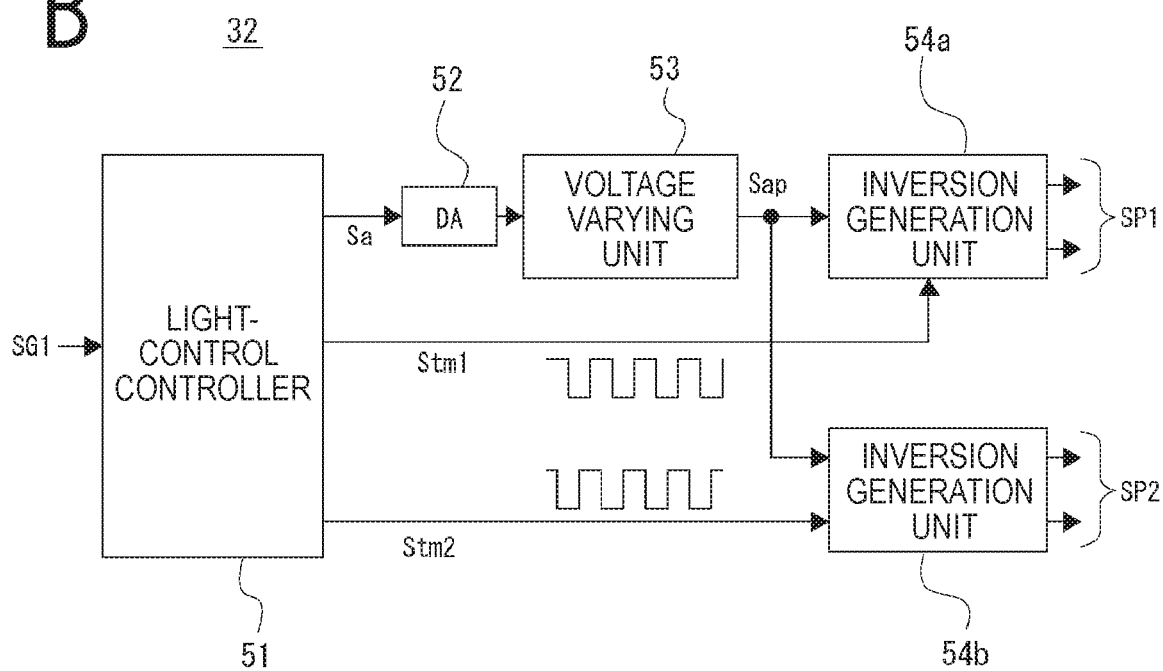

An example of the configuration of the light control driving unit 32 that generates such liquid crystal driving signals SP1 and SP2 is illustrated in FIGS. 9A and 9B.

In the configuration example of FIG. 9A, the light control driving unit 32 includes a light-control controller 51, D/A converters 52a and 52b, voltage varying units 53a and 53b, and inversion generation units 54a and 54b.

The light-control controller 51 receives an indication of brightness, that is, an indication of transmittance in accordance with the light-control control signal SG1 from the camera control unit 30, determines the amplitude levels of the liquid crystal driving signals SP1 and SP2 depending on the indications, and outputs amplitude signals Sa1 and Sa2 as digital values indicating the amplitude value.

The amplitude signal Sa1 is converted into an analog signal by the D/A converter 52a and is supplied to the voltage varying unit 53a.

In addition, the amplitude signal Sa2 is converted into an analog signal by the D/A converter 52*b* and is supplied to the voltage varying unit 53*b*.

Further, the light-control controller 51 sets the frequency and inversion timing as the liquid crystal driving signals SP1 and SP2. In one example, timing signals Stm1 and Stm2 inverted at the frequency fs1 described above are output. Here, the timing signals Stm1 and Stm2 are signals whose phases are shifted by 90°.

The voltage varying unit 53*a* amplifies the amplitude signal Sa1 (voltage) from the D/A converter 52*a* to a level necessary for driving the liquid crystal at a predetermined amplification factor, further amplifies the signal Si1 obtained by switching between H and L at the timing of the timing signal Stm1, and outputs it to the inversion generation unit 54*a*. The inversion generation unit 54*a* sets the signal Si1 as a signal to be applied to the transparent electrode film 44*a*, and sets the inverted signal of the signal Si1 as a signal to be applied to the transparent electrode film 44*b*. This is the liquid crystal driving signal SP1 to be applied to the transparent electrode films 44*a* and 44*b*.

The voltage varying unit 53*b* amplifies the amplitude signal Sa2 (voltage) from the D/A converter 52*b* to a level necessary for driving the liquid crystal at a predetermined amplification factor, further amplifies the signal Si2 obtained by switching between H and L at the timing of the timing signal Stm2, and outputs it to the inversion generation unit 54*b*. The inversion generation unit 54*b* sets the signal Si2 as a signal to be applied to the transparent electrode film 47*a* and sets the inverted signal of the signal Si2 as a signal to be applied to the transparent electrode film 47*b*. This is the liquid crystal driving signal SP2 to be applied to the transparent electrode films 47*a* and 47*b*.

FIG. 9B illustrates a configuration example in which the D/A converter 52 and the voltage varying unit 53 are set to be common.

The light-control controller 51 outputs the amplitude signal Sa representing the amplitude value corresponding to the transmittance indicated by the light-control control signal SG1. The amplitude signal Sa is converted into an analog signal by the D/A converter 52, and is supplied to the voltage varying unit 53. The voltage varying unit 53 amplifies the amplitude signal Sa to a level necessary for driving the liquid crystal at a predetermined amplification factor and outputs it as a signal Sap to the inversion generation units 54*a* and 54*b*.

The light-control controller 51 supplies the timing signals Stm1 and Stm2 whose phases are shifted by 90° to the inversion generation units 54*a* and 54*b*.

The inversion generation unit 54*a* generates a signal obtained by switching the signal Sap between H and L using the timing signal Stm1 and its inverted signal and outputs them as the liquid crystal driving signal SP1 to the transparent electrode films 44*a* and 44*b*.

The inversion generation unit 54*b* generates a signal obtained by switching the signal Sap between H and L using the timing signal Stm2 and its inverted signal and outputs them as the liquid crystal driving signal SP2 to the transparent electrode films 47*a* and 47*b*.

Moreover, the configurations of FIGS. 9A and 9B are examples, and other configuration examples are also conceivable.

In each of the above examples, it is also conceivable that the D/A converters 52*a*, 52*b*, and 52 are incorporated in the light-control controller 51.

4. Other Configuration Examples

The above embodiment describes the example in which the liquid crystal light control element 11 and the light control driving unit 32 are provided in the main body of the imaging apparatus 1 as illustrated in FIG. 1B. However, as illustrated in FIG. 1C, in some cases, the liquid crystal light control element 11 and the light control driving unit 32 are provided on the side of the lens barrel 2.

Figure 10:
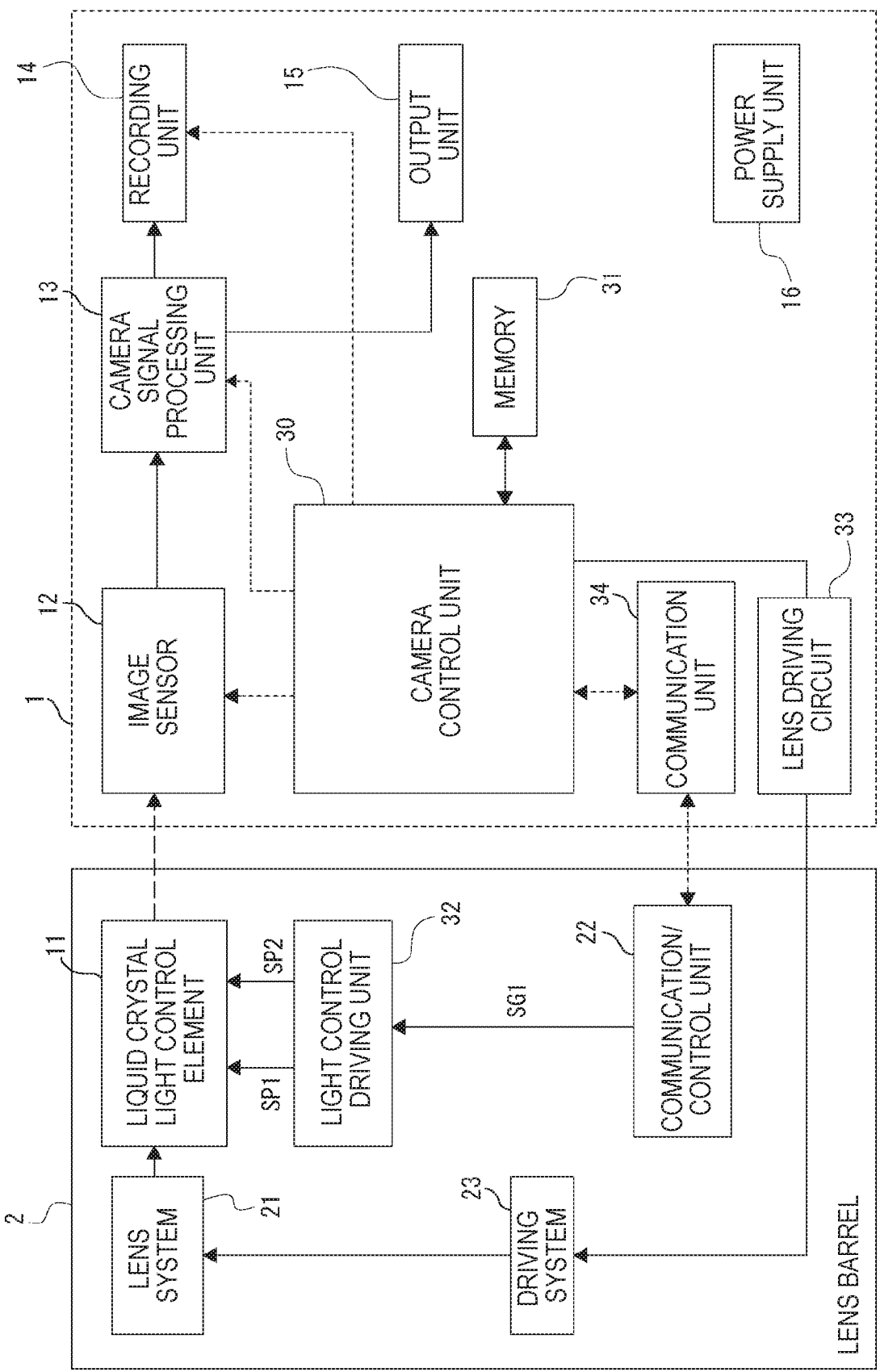
FIG. 10 is a block diagram of another example of the internal configuration of the imaging apparatus according to the embodiment.

FIG. 10 illustrates a configuration example in such case. This differs from the configuration example of FIG. 5 in that the configuration in which the liquid crystal light control element 11 and the light control driving unit 32 are provided on the side of the lens barrel 2 becomes a path for indicating the transmittance from the camera control unit 30.

In other words, in the case of FIG. 10, the camera control unit 30 transmits the indication of transmittance via the communication unit 34. Then, the communication/control unit 22 provides the light-control control signal SG1 to the light control driving unit 32 depending on the indication.

The configuration and operation of the light control driving unit 32 are the same as that described above.

Moreover, if a terminal for the light-control control signal SG1 can be prepared at the terminal portion 85, in one example, as a communication terminal between the main body of the imaging apparatus 1 and the lens barrel 2, the camera control unit 30 may be configured to directly supply light-control control signal SG1 to the light control driving unit 32.

FIG. 2A illustrates a case where the liquid crystal light control element 11 and the light control driving unit 32 are arranged separately in the side of the lens barrel 2 and in the main body of the imaging apparatus 1. Although the configuration in this case is not illustrated, the liquid crystal driving signals SP1 and SP2 from the light control driving unit 32 may be transmitted to the side of the lens barrel 2. In one example, terminals for the liquid crystal driving signals SP1 and SP2 are provided at the terminal portion 85.

Although FIG. 2B illustrates the fixed lens type imaging apparatus, it is sufficient that the configuration of FIG. 5 is provided in the main body of the imaging apparatus 1, so its illustration is omitted. However, the configuration that does not necessarily include the communication unit 34 and the communication/control unit 22 is possible.

5. Closing Remarks and Modifications

The following effects can be obtained from the above embodiment.

In the embodiment, in the liquid crystal light control element 11, the plurality of liquid crystal layers 45 and 48 sandwiched between two electrodes serving as electrodes at both ends are arranged side by side in the direction of an optical axis of transmitted light. The light control driving unit 32 applies the liquid crystal driving signals SP1 and SP2 that are inverted at predetermined intervals to both electrodes (44*a* and 44*b*, 47*a* and 47*b*) of each of the liquid crystal layers 45 and 48 of the liquid crystal light control element 11, and sets the driving signals SP1 and SP2 as signals whose phase shift from the in-phase or reversed-phase relationship. Specifically, a signal whose phase is shifted by 90° is set.

This causes the inversion timing of the plurality of liquid crystal layers 45 and 48 to be shifted and makes it possible for the influence of the liquid crystal light control element as a whole on the transmitted light to be similar to the case where the inversion frequency is increased.

In other words, by increasing the times of occurrence of noise appearing in the quantity of output light due to inversion, the influence of noise is dispersed. Thus, it is possible to reduce or eliminate deterioration of uniformity due to streaks, unevenness, or the like on the image. In addition, the liquid crystal driving signals SP1 and SP2 of the relatively low frequency fs1 are used, so it is possible to reduce power consumption and to obtain allowable charging time.

In other words, it is possible to achieve the capability equivalent to the relatively high frequency fs2 that is set in terms of image quality and to achieve twice the charge allowable time and half power consumption as compared to the case the driving is performed at the frequency fs2.

Moreover, although the liquid crystal light control element 11 has the structure in which the liquid crystal layers are divided into upper and lower two layers, the functions of these liquid crystal layers 45 and 48 may be optically the same or may be optically compensated. An example of the compensating relationship includes offsetting of optical anisotropy determined in each orientation direction in upper and lower layers or the like.

Further, in a case where the number of liquid crystal layers is three or more, it is also conceivable that the phases of the liquid crystal light control elements 11 for the respective liquid crystal layers are shifted so as not to have the in-phase or reversed-phase relationship.

In the embodiment, by setting the liquid crystal driving signals SP1 and SP2 as signals whose phases are shifted by 90°, the inversion timings of the two liquid crystal layers 45 and 48 are equally shifted. Thus, the noise occurring in the transmitted light at the time of liquid crystal inversion can be equally distributed similarly to the case where the driving signal is set to twice the frequency.

Moreover, the phase shift of the liquid crystal driving signals SP1 and SP2 may be other than 90°.

In addition, the liquid crystal driving signals SP1 and SP2 applied by the light control driving unit 32 to the liquid crystal light control element 11 are signals that change the transmittance of the liquid crystal layer depending on the amplitude level. This allows variable light control to be properly performed by the liquid crystal driving signals SP1 and SP2.

Further, as illustrated in FIG. 9A, the plurality of timing signals Stm1 and Stm2 whose phases are shifted from the in-phase or reversed-phase relationship are generated, and the liquid crystal driving signals SP1 and SP2 for the respective liquid crystal layers 45 and 48 are generated using the amplitude signals Sa1 and Sa2 corresponding to the transmittance of the respective liquid crystal layers 45 and 48 and the timing signals Stm1 and Stm2. This makes it possible to generate easily the plurality of liquid crystal driving signals SP1 and SP2 whose phases are shifted.

Further, in particular, as illustrated in FIG. 9B, the liquid crystal driving signals SP1 and SP2 for the respective liquid crystal layers 45 and 48 are generated using the plurality of timing signals Stm1 and Stm2 with respect to the amplitude signal Sa generated in common for the respective liquid crystal layers 45 and 48. It is possible to simplify the configuration of the light control driving unit 32.

Further, the imaging apparatus 1 has the configuration in which the liquid crystal light control element 11 is arranged in the path of incident light and includes the image sensor 12 that generates the captured image signal by photoelectrically converting the light incident through the liquid crystal light control element 11.

This allows the light incident on the image sensor 12 to be adjusted by the liquid crystal light control element 11 and allows the inversion timing of each of the liquid crystal layers 45 and 48 of the liquid crystal light control element 11 to be dispersed by the liquid crystal driving signals SP1 and SP2, thereby reducing the influence of noise on the image signal obtained by the image sensor 12.

Further, the imaging apparatus 1 includes the mounting portion 80 for mounting the interchangeable lens.

In view of the interchangeable lens type imaging apparatus, it is typically conceivable to arrange the light control element on the side of the interchangeable lens. However, in the case where the liquid crystal light control element is incorporated in the interchangeable lens, in order to implement the function including automatic light control, it is necessary to provide a light control element in all the interchangeable lenses and to prepare a light control element corresponding to the type of interchangeable lens.

On the other hand, the arrangement of the liquid crystal light control element 11 in the main body of the imaging apparatus 1 to which the interchangeable lens is mounted makes it possible to implement the light control function in combination with various lens systems 21 in the interchangeable lens type imaging apparatus 1.

in particular, in this case, the mount portion 80, the liquid crystal light control element 11, and the image sensor 12 are arranged to have positional relationship between them in this order, as viewed from the side of a photographic subject, in the direction of an optical axis of the incident light, thereby achieving the arrangement suitable for the light control operation.

Further, in the imaging apparatus 1, the liquid crystal light control element 11 is retractable from the path of incident light.

In addition, in the state where the liquid crystal light control element 11 is retracted, the clear glass 82 is inserted into the path of incident light.

The retraction of the liquid crystal light control element 11 makes it possible to maximize the transmittance. In addition, the insertion of the clear glass 82 into the path of incident light when the liquid crystal light control element 11 is retracted makes it possible to obtain the state that is similar to the optical state in the case where the liquid crystal light control element 11 is arranged in the path. This allows variations in optical properties corresponding to the presence or absence of the liquid crystal light control element 11 on the path of incident light to be reduced, thereby stabilizing the image quality irrespective of whether the liquid crystal light control element 11 is retracted.

Moreover, the effects described herein are illustrative and not restrictive, and other advantageous effects can be taken.

Additionally, the present technology may also be configured as below.

(1)

A light control driving device including:

a liquid crystal light control element that has a plurality of liquid crystal layers sandwiched between two electrodes serving as electrodes at both ends and arranged side by side in a direction of an optical axis of transmitted light, and allows a driving signal that is inverted at a predetermined interval to be applied to the electrodes at both ends of each of the liquid crystal layers, each driving signal being set as a signal whose phase is shifted from an in-phase or reversed-phase relationship.

(2)

The light control driving device according to (1), in which the liquid crystal light control element includes two liquid crystal layers, and each of the driving signals applied to the electrodes at both ends of each of the liquid crystal layers is set as a signal whose phase is shifted by 90°.

(3)

The light control driving device according to (1) or (2), in which each of the driving signals is a signal that changes transmittance of the liquid crystal layer using an amplitude level.

(4)

The light control driving device according to any of (1) to (3), in which a plurality of timing signals whose phases are shifted from the in-phase or reversed-phase relationship are generated, and the driving signal for each of the liquid crystal layers is generated using an amplitude signal corresponding to transmittance of each of the liquid crystal layers and the plurality of timing signals.

(5)

The light control driving device according to (4), in which the driving signal for each of the liquid crystal layers is generated using the plurality of timing signals with respect to the amplitude signal generated in common for the respective liquid crystal layers.

(6)

An imaging apparatus including:

a liquid crystal light control element that has a plurality of liquid crystal layers sandwiched between two electrodes serving as electrodes at both ends and arranged side by side in a direction of an optical axis of transmitted light; and a light control driving unit configured to apply a driving signal that is inverted at a predetermined interval to the electrodes at both ends of each of the liquid crystal layers of the liquid crystal light control element, each driving signal being set as a signal whose phase is shifted from an in-phase or reversed-phase relation ship.

(7)

The imaging apparatus according to (6), in which the liquid crystal light control element includes two liquid crystal layers, and the light control driving unit sets each of the driving signals that is applied to the electrodes at both ends of each of the liquid crystal layers of the liquid crystal light control element as a signal whose phase is shifted by 90°.

(8)

The imaging apparatus according to (6) or (7)

in which each of the driving signals that is applied to the liquid crystal light control element by the light control driving unit is a signal that changes transmittance of the liquid crystal layer using an amplitude level.

(9)

The imaging apparatus according to any of (6) to (8), in which the light control driving unit generates a plurality of timing signals whose phases are shifted from the in-phase or reversed-phase relationship, and the driving signal for each of the liquid crystal layers is generated using an amplitude signal corresponding to transmittance of each of the liquid crystal layers and the plurality of timing signals.

(10)

The light control driving device according to (9), in which the light control driving unit generates the driving signal for each of the liquid crystal layers using the plurality of timing signals with respect to the amplitude signal generated in common for the respective liquid crystal layers.

(11)

The imaging apparatus according to any of (6) to (10), in which the liquid crystal light control element is arranged in a path of incident light, and the imaging apparatus includes an image sensor configured to photoelectrically convert light incident through the liquid crystal light control element to generate a captured image signal.

(12)

The imaging apparatus according to any of (6) to (11), including:

a mounting portion configured to mount an interchangeable lens; and an image sensor configured to photoelectrically convert light incident through the liquid crystal light control element to generate a captured image signal, in which the mounting portion, the liquid crystal light control element, and the image sensor are positioned in such a way as to be arranged in an arrangement order of the mounting portion, the liquid crystal light control element, and the image sensor in a direction of an optical axis of incident light as viewed from a photographic subject side.

(13)

The imaging apparatus according to (12), in which the liquid crystal light control element is retractable from a path of incident light.

(14)

The imaging apparatus according to (13), in which a clear glass is inserted into the path of incident light in a state in which the liquid crystal light control element is retracted.

(15)

A light control driving method including:

driving a liquid crystal light control element that has a plurality of liquid crystal layers sandwiched between two electrodes serving as electrodes at both ends and arranged side by side in a direction of an optical axis of transmitted light; and applying a driving signal that is inverted at a predetermined interval and is shifted from an in-phase or reversed-phase relationship to the electrodes at both ends of each of the liquid crystal layers.

REFERENCE SIGNS LIST 1 imaging apparatus
2 lens barrel
11 liquid crystal light control element
12 image sensor
13 camera signal processing unit
14 recording unit
15 Output unit
30 camera control unit
31 memory unit
32 light control driving unit
34 communication unit

The invention claimed is:

1. An imaging apparatus comprising:

a liquid crystal light control element that comprises:
　an upper liquid crystal layer between a first electrode and a second electrode,
　the second electrode between a substrate and the upper liquid crystal layer,
　a third electrode between the substrate and a lower liquid crystal layer; and a light control driving unit that is configured to:
　supply, to the first electrode, an upper liquid crystal driving signal,
　supply, to the second electrode, a signal that is inverted from the upper liquid crystal driving signal,
　supply, to the third electrode, a lower liquid crystal driving signal, wherein the lower liquid crystal driving signal differs from the signal that is inverted from the upper liquid crystal driving signal.

2. The imaging apparatus according to claim 1, wherein the light control driving unit configured to adjust an amplitude level of the upper liquid crystal driving signal in a manner that causes a change in a transmittance of the upper liquid crystal layer.

3. The imaging apparatus according to claim 1, wherein the liquid crystal light control element comprises the lower liquid crystal layer between the third electrode and a fourth electrode, and
wherein the light control driving unit is configured to supply, to the fourth electrode, a signal that is inverted from the lower liquid crystal driving signal.

4. The imaging apparatus according to claim 1, wherein the light control driving unit configured to adjust an amplitude level of the lower liquid crystal driving signal in a manner that causes a change in a transmittance of the upper liquid crystal layer.

5. The imaging apparatus according to claim 1, wherein a phase of the upper liquid crystal driving signal is shifted from a phase of the lower liquid crystal driving signal.

6. The imaging apparatus according to claim 1, wherein the upper liquid crystal driving signal is in reversed-phase with the lower liquid crystal driving signal.

7. The imaging apparatus according to claim 1, wherein the lower liquid crystal driving signal is a rectangular wave.

8. The imaging apparatus according to claim 1, wherein the upper liquid crystal driving signal is a rectangular wave.

9. The imaging apparatus according to claim 1, wherein the substrate is a glass substrate.

10. The imaging apparatus according to claim 1, further comprising:
an image sensor configured to photoelectrically convert incident light into a captured image signal, the liquid crystal light control element is between the image sensor and a source of the incident light.

11. The imaging apparatus according to claim 10, further comprising:
a mounting portion configured to mount an interchangeable lens, the image sensor is between the liquid crystal light control element and the mounting portion.

12. The imaging apparatus according to claim 10, further comprising:
a holder configured to retract the liquid crystal light control element from a path of the incident light.

13. The imaging apparatus according to claim 12, further comprising:
a clear glass is insertable into the path of incident light when the holder retracts the liquid crystal light control element from the path of the incident light.

14. A light control driving method comprising:
supplying, from a light control driving unit to a first electrode, an upper liquid crystal driving signal, wherein an upper liquid crystal layer is between the first electrode and a second electrode;
supplying, from the light control driving unit to the second electrode, a signal that is inverted from the upper liquid crystal driving signal, wherein the second electrode is between a substrate and the upper liquid crystal layer; and
supplying, from the light control driving unit to a third electrode, a lower liquid crystal driving signal, wherein the third electrode is between the substrate and a lower liquid crystal layer.

15. The light control driving method according to claim 14, further comprising:
adjusting, by the light control driving unit, an amplitude level of the upper liquid crystal driving signal in a manner that changes a transmittance of the upper liquid crystal layer.

16. The light control driving method according to claim 15, further comprising:
supplying, from the light control driving unit to a fourth electrode, a signal that is inverted from the lower liquid crystal driving signal, wherein the lower liquid crystal layer is between the third electrode and the fourth electrode.

17. The light control driving method according to claim 15, further comprising:
adjusting, by the light control driving unit, an amplitude level of the lower liquid crystal driving signal in a manner that changes a transmittance of the lower liquid crystal layer.

18. The light control driving method according to claim 15, further comprising:
shifting, by the light control driving unit, a phase of the upper liquid crystal driving signal from a phase of the lower liquid crystal driving signal.

19. The light control driving method according to claim 15, further comprising:
reversing, by the light control driving unit, a phase of the upper liquid crystal driving signal from a phase of the lower liquid crystal driving signal.

20. The light control driving method according to claim 14, wherein the substrate is a glass substrate.

* * * * *